(12) United States Patent
Gutacker et al.

(10) Patent No.: US 12,129,340 B2
(45) Date of Patent: Oct. 29, 2024

(54) METHOD FOR PREPARING HALOGEN-FUNCTIONALIZED POLYSILOXANES

(71) Applicant: Henkel AG & Co. KGaA, Duesseldorf (DE)

(72) Inventors: Andrea Gutacker, Langenfeld (DE); Johann Klein, Duesseldorf (DE); Annika Dietrich, Rostock (DE); Esteban Mejia, Rostock (DE); Therese Hemery, Wiesbaden (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 662 days.

(21) Appl. No.: 17/335,258

(22) Filed: Jun. 1, 2021

(65) Prior Publication Data

US 2021/0292486 A1    Sep. 23, 2021

Related U.S. Application Data

(63) Continuation of application No. PCT/EP2019/082318, filed on Nov. 22, 2019.

(30) Foreign Application Priority Data

Dec. 3, 2018   (EP) .................................. 18209736

(51) Int. Cl.
| | |
|---|---|
| C08G 77/385 | (2006.01) |
| B01J 23/42 | (2006.01) |
| C08G 77/04 | (2006.01) |
| C08G 77/08 | (2006.01) |
| C08G 77/12 | (2006.01) |
| C08G 77/24 | (2006.01) |

(52) U.S. Cl.
CPC ............ *C08G 77/385* (2013.01); *B01J 23/42* (2013.01); *C08G 77/045* (2013.01); *C08G 77/08* (2013.01); *C08G 77/12* (2013.01); *C08G 77/24* (2013.01)

(58) Field of Classification Search
CPC .... C08G 77/38; C08G 77/388; C08G 77/392; C08G 77/385; C08G 77/395
See application file for complete search history.

(56) References Cited

U.S. PATENT DOCUMENTS

| | | | |
|---|---|---|---|
| 2,823,218 A | 2/1958 | Speier et al. | |
| 3,715,334 A | 2/1973 | Karstedt | |
| 3,814,730 A | 6/1974 | Karstedt | |
| 3,923,705 A | 12/1975 | Smith | |
| 6,491,981 B1 * | 12/2002 | Guichard | ............. C08G 77/385 528/42 |

FOREIGN PATENT DOCUMENTS

| | | |
|---|---|---|
| CA | 2025304 A1 * | 8/1991 |
| CN | 102408570 A | 4/2012 |

OTHER PUBLICATIONS

"Catalytic Reductions of Cyclic Ethers with Hydrosilanes" authored by Park and published in Chem Asian J. (2019) 14, 2048-2066.*
Joji Ohshita et al., Ring-Opening Iodo- and Bromosilation of Cyclic Ethers by Treatment with Iodo- and Bromotrialkylsilane Equivalents, Japan J. Org. Chem. 1999, vol. 64, No. 21, pp. 8024-8026.
Joji Ohshita et al., Palladium-catalyzed synthesis of poly(bromoalkoxy- and bromoalkanoyloxymethylsiloxane)s from poly(hydromethylsiloxane)s, J. Organometallic Chem. 692 (2007), pp. 3526-3531.
Chaohong Dong et al., Synthesis of a Polysiloxane with High Reaction Activity, China Advanced Materials Research, vols. 998-999, 2014, pp. 15-18.
G. Sauvet et al., *Biocidal Polymers Active by Contact. V. Synthesis of Polysiloxanes with Biocidal Activity*, Laboratoire de Recherches sur les Macromolecules (U.A. 502), Université Paris-XIII, avenue J.-B. Clement, 93430 Villetaneuse, France 2 Centre of Molecular and Macromolecular Studies, Polish Academy of Sciences, Sienkiewicza 112, 90-363 Lo' dz, Poland Journal of Applied Polymer Science, 2000, pp. 1005-1012.
Zhou Lu et al., Palladium-catalyzed formation and reactions of iodo- and bromosiloxane intermediates, Journal of Organometallic Chemistry 697, 2012, pp. 51-56.
Arihiro Iwata et al., Ring-Opening Iodo- and Bromosilation of Lactones for the Formation of Silyl Haloalkanoates, J. Org Chem. 2002, vol. 67, No. 11, pp. 3927-3929.
Joji Ohshita et al., Ring-opening reactions of cyclic ethers with diiodo and dibromodimethylsilane equivalents, Journal of Organometallic Chemistry 691 (2006) pp. 1907-1911.

(Continued)

*Primary Examiner* — Marc S Zimmer
(74) *Attorney, Agent, or Firm* — Mary K. Cameron (57) ABSTRACT

The present invention relates to a procedure in which a functionalized polysiloxane is synthesized in the presence of a platinum catalyst, and halogen-functionalized polysiloxanes obtained according to the procedure. The procedure is defined herein by reacting a) at least one polysiloxane comprising at least one hydrogen atom bonded to a silicon atom; b) at least one heterocyclic compound; and c) at least one halogen-containing compound, wherein the reaction is catalyzed by at least one platinum catalyst. The synthetic pathway is described as a halosilation reaction in which a heterocyclic molecule is ring-opened in the presence of a platinum catalyst and a halogen source, resulting in a formal insertion of the opened heterocycle into the SiH bond. On the final product, the heteroatom of the former heterocycle is bonded to the silicon atom from the former hydrosiloxane moiety while the halogen is bonded to the last carbon atom of the opened chain.

13 Claims, 2 Drawing Sheets

(56) References Cited

OTHER PUBLICATIONS

Chaohong Dong et al., Synthesis and Application of a Novel Modified Polysiloxane Polymer with High Reaction Activity as Water Repellent Agent for Cotton Fabrics, Journal of Engineered Fibers and Fabrics vol. 10, 2, 2015, pp. 171-180.
Fan et al., Rhodium catalyzed ring-opening iodosilation reaction of tetrahydrofuran, ISSN 1672-8513, 2013, 22, pp. 157-161.
International Search Report for International PCT Patent Application No. PCT/EP2019/082318 dated Dec. 12, 2019.

\* cited by examiner

METHOD FOR PREPARING HALOGEN-FUNCTIONALIZED POLYSILOXANES

The present invention relates to a method for preparing halogen-functionalized polysiloxanes in the presence of a platinum catalyst. More particularly, the present invention is directed to a method for preparing halogen-functionalized polysiloxanes by reacting at least one polysiloxane comprising at least one hydrogen atom bonded to a silicon atom, at least one heterocyclic compound, and at least one halogen-containing compound, wherein the reaction is catalyzed by at least one platinum catalyst. In addition, the present invention is directed to a halogen-functionalized polysiloxane obtained thereby.

Processes for the introduction of halogen functionalities into a polysiloxane are known in technical literature. The introduction of said functionalities as side groups poses several challenges compared to the end-chain functionalization which is rather straightforward. The steric hindrance through the tail or entanglements causes a lower conversion and a longer reaction time. Therefore, halogen-functionalized polysiloxanes are often formed by the condensation of halogen-functionalized silanes as described in P. Liu, et al., Materials Science and Engineering: C, 33 (2013), 3865 and G. Sauvet, et al., J. Appl. Polym. Sci. 75 (2000), 1005-1012 or by the hydrosilylation or condensation where polysiloxanes with Si—C bonds are formed.

J. Ohshita, et al., The Journal of Organic Chemistry 1999, 64, 8024-8026, A. Iwata et al., The Journal of Organic Chemistry 2002, 67, 3927-3929, and J. Ohshita, et al., J. Organomet. Chem. 2006, 691, 1907-1911 disclose ring-opening halosilation of cyclic ethers with the use of iodosilane or bromosilane in the presence of a palladium catalyst. In addition, J. Ohshita, et al., J. Organomet. Chem. 2007, 692, 3526-3531 discloses the treatment of poly(hydromethylsilxoane)s with mixtures of allyl bromide and cyclic ethers in the presence of a palladium catalyst to form poly[(bromoalkoxy)methylsiloxane]s. Halosilation reactions of polysiloxanes with different starting materials are also described in Z. Lu, et al., J. Organomet. Chem. 2012, 697, 51-56, C. H. L. Dong, Zhou et al., Adv. Mater. Res. 2014, 998-999, 15, C. L. Dong, Zhou et al., J. Eng. Fibers Fabr. 2015, 10, 171, and CN Patent 102408570.

In the above-described literature, palladium chloride was used as catalyst, which has to be added as solid to the reaction mixture. Furthermore, high amount of catalyst was employed, which leads to high costs by up-scaling processes. As the palladium cannot be removed completely by the described working-up processes, the purified products can get brown to black by precipitation of $Pd^0$. The remaining palladium starts to agglomerate and colors the product. Such palladium contamination can affect further reactions or other applications.

Therefore, it is an object of the present invention to provide a method for preparing halogen-functionalized polysiloxanes which overcomes at least some of drawbacks of the known systems.

The present invention achieves said object by providing a method for preparing halogen-functionalized polysiloxanes, wherein the reaction is catalyzed by at least one platinum catalyst. It has been found that the use of a platinum catalyst leads to an easier working-up and a better removing of catalyst from the final product. The platinum-catalyzed reaction process according to the present invention need a lower amount of catalyst compared to the conventional procedure, e.g., based on palladium catalyst. Hence, the obtained products according to the present invention can be purified easily and no substantial amount of remaining catalyst is found.

Furthermore, as the reaction catalyzed by platinum catalyst according to the present invention follows a zero-order kinetic, meaning that the reaction rate does not depend on the concentration of any monomer, the reaction speed remains constant during the whole reaction time. Hence, the high yield in a short time is achieved compared to the reaction following the first order kinetic regime.

In accordance with the first aspect of the invention there is provided a method for preparing halogen-functionalized polysiloxanes by reacting a) at least one polysiloxane comprising at least one hydrogen atom bonded to a silicon atom; b) at least one heterocyclic compound; and c) at least one halogen-containing compound, wherein the reaction is catalyzed by at least one platinum catalyst. Transparent and colorless halogen-functionalized polysiloxanes can be obtained according to the present invention.

The polysiloxane comprising at least one hydrogen atom bonded to a silicon atom can be a linear- or cyclopolysiloxane, or a mixture thereof.

In accordance with the second aspect of the invention there is provided halogen-functionalized polysiloxanes obtainable by the method defined herein.

As used herein, the singular forms "a", "an" and "the" include plural referents unless the context clearly dictates otherwise.

The terms "comprising" and "comprises" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

As used herein, room temperature is 23° C. plus or minus 2° C.

The molecular weights given in the present text refer to number average molecular weights (Mn), unless otherwise stipulated. All molecular weight data refer to values obtained by gel permeation chromatography (GPC) carried out using HP1090 II Chromatography with DAD detector (HEWLETT PACKARD) at 40° C. Tetrahydrofuran (THF) was used as an eluent. THF was passed through three PSS SDV gel columns with molecular weight ranges of 102, 103 and 104 $g \cdot mol^{-1}$ with a flow rate of 0.9 $ml \cdot min^{-1}$. The calibration of the device was carried out using polystyrene standards"

As used herein, "polydispersity" refers to a measure of the distribution of molecular mass in a given polymer sample. The polydispersity is calculated by dividing the weight average molecular weight (Mw) by the number average molecular weight (Mn).

For convenience in the description of the process of this invention, unsaturation provided by $CH_2=CH-CH_2$-terminal group is referred to as "allyl" unsaturation.

As used herein, "$C_1$-$C_8$ alkyl" group refers to a monovalent group that contains 1 to 8 carbons atoms, that is a radical of an alkane and includes linear and branched organic groups. Examples of alkyl groups include but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1 to 6 carbon atoms ($C_1$-$C_6$ alkyl)—for example unsubstituted alkyl groups containing from 1 to 4 carbon atoms ($C_1$-$C_4$ alkyl)—should be noted.

As used herein, the term "$C_2$-$C_5$ alkenyl" group refers to an aliphatic hydrocarbon group which contains 2 to 8 carbon atoms and at least one carbon-carbon double bond, e.g., ethenyl, propenyl, butenyl, or pentenyl and structural isomers thereof such as 1- or 2-propenyl, 1-, 2-, or 3-butenyl, etc. Alkenyl groups can be linear or branched and substituted or unsubstituted. If they are substituted, the substituents are as defined above for alkyl.

As used herein, the term "$C_2$-$C_8$ alkynyl" group refers to an aliphatic hydrocarbon group which contains 2 to 8 carbon atoms and at least one carbon-carbon triple bond, e.g., ethynyl (acetylene), propynyl, butynyl, or pentynyl and structural isomers thereof as described above. Alkynyl groups can be linear or branched and substituted or unsubstituted.

The term "$C_3$-$C_{10}$ cycloalkyl" is understood to mean a saturated, mono-, bi- or tricyclic hydrocarbon group having from 3 to 10 carbon atoms. Examples of cycloalkyl groups include: cyclopropyl; cyclobutyl; cyclopentyl; cyclohexyl; cycloheptyl; cyclooctyl; adamantane; and norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl; tetrahydronaphthyl, tetrahydroindenyl; tetrahydroanthracenyl; and anthracenyl. And a preference for phenyl groups may be noted.

As used herein, an "aralkyl" group refers to an alkyl group that is substituted with an aryl group. An example of an aralkyl group is benzyl.

The terms "$C_1$-$C_{60}$ alkylene" group and "$C_1$-$C_{20}$ alkylene" group refer respectively to divalent groups that contain from 1 to 60 or from 1 to 20 carbon atoms, that are radicals of an alkane and include linear, branched or cyclic groups, which groups may be substituted or substituted and may optionally be interrupted by at least one heteroatom.

As used herein, the term "alkenylene" group refers to a divalent aliphatic hydrocarbon group having at least one carbon-carbon double bond that is a radical of an alkene. An alkenylene group can be linear or branched and substituted or unsubstituted.

As used herein, the term "alkynylene" group refers to a divalent aliphatic hydrocarbon group having at least one carbon-carbon triple bond, that is a radical of an alkyne. An alkynylene group can also have one or more carbon-carbon double bonds. An alkynylene group can be linear or branched and substituted or unsubstituted.

As used herein, the term "arylene" group refers to a divalent group that is a radical of an aryl group. Suitable arylene group includes phenylene, furanylene, piperidylene, and naphthylene.

As used herein, the term "aralkylene" group refers to a divalent group that is a radical of an aralkyl group. An aralkylene can be represented by the formula —R—Ar— where R is an alkylene and Ar is an arylene, i.e., an alkylene is bonded to an arylene. Suitable aralkylene groups includes xylylene and toluenylene.

Where mentioned, the expression "contain at least one heteroatom" means that the main chain or side chain of a residue comprises at least one atom that differs from carbon atom and hydrogen. Preferably the term "heteroatom" refers to nitrogen, oxygen, silicon, sulfur, phosphorus, halogens such as Cl, Br, F. Oxygen (O) and nitrogen (N) may be mentioned as typical heteroatoms in the context of the present invention.

As used herein, the term "hydrocarbon residue" includes saturated or unsaturated hydrocarbon residues.

As used herein, the "heterocyclic compound" refers to a saturated or unsaturated, monocyclic, bicyclic, polycyclic or fused compound containing at least one heteroatom, preferably O, S, N, and/or P, in the ring structure.

As used herein, the term "halogen" refers to fluorine, chlorine, bromine or iodine and correspondingly the term "halide" denotes fluoride, chloride, bromide or iodide anions.

The reaction method according to the present invention is catalyzed by a platinum catalyst. The platinum catalyst can be selected from the group consisting of chloroplatinic acids, preferably hexachloroplatinic acid; alcohol modified chloroplatinic acids; olefin complexes of chloroplatinic acid; complexes of chloroplatinic acid and divinyltetramethyldisiloxane; fine platinum particles adsorbed on carbon carriers; platinum supported on metal oxide carriers, preferably $Pt(Al_2O_3)$; platinum black; platinum acetylacetonate; platinous halides, preferably $PtCl_2$, $PtCl_4$, $Pt(CN)_2$; complexes of platinous halides with unsaturated compounds, preferably ethylene, propylene, and organovinylsiloxanes; styrene hexamethyldiplatinum; platinum divinyltetramethyldisiloxane complex; the reaction product of chloroplatinic acid and an unsaturated aliphatic group-containing organosilicon compound; and neutralized a complex of platinous chloride and divinyltetramethyldisiloxane.

In preferred embodiments, the platinum catalyst is hexachloroplatinic acid, commonly referred to as Speier's catalyst, which is described in U.S. Pat. Nos. 2,823,218 and 3,923,705, or Karstedt's catalyst, which is described in U.S. Pat. Nos. 3,715,334 and 3,814,730. Karstedt's catalyst is a platinum divinyltetramethyldisiloxane complex typically containing about one-weight percent of platinum in a solvent such as toluene.

In preferred embodiments, the platinum catalyst is present in an amount of from 0.0001 mol % to 10 mol %, more preferably 0.001 mol % to 0.1 mol %, of platinum based on the molar quantity of silicon-bonded hydrogen in the polysiloxane.

In certain embodiments, the obtained halogen-functionalized polysiloxane has a number average molecular weight of from 100 to 50,000 g/mol, preferably from 100 to 25,000 g/mol, more preferably 100 to 15,000 g/mol.

In preferred embodiments, the obtained halogen-functionalized polysiloxane has the general Formula (I) or (I-A) or is a mixture thereof:

wherein:
$R^1$, $R^2$, $R^3$, $R^4$, $R^5$ and $R^6$ may be the same or different and each is independently selected from a hydrogen atom or a linear, branched or cyclic hydrocarbon residue having 1 to 20 carbon atoms which may contain at least one heteroatom;

A is a heteroatom, preferably O or S, or a heteroatom-containing group, preferably $NR^7$ or $PR^7$, where $R^7$ is selected from a hydrogen atom, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom;

Z is selected from a linear, branched or cyclic hydrocarbon residue having 2 to 60 carbon atoms which may contain at least one heteroatom;

X is a halogen atom;

in Formula (I) n1 is an integer from 1 to 1000, n2 is an integer from 0 to 100, and p is an integer from 0 to 1000;

in Formula (I-A) n1 is an integer from 1 to 100, n2 is an integer from 0 to 10, and p is an integer from 0 to 100, wherein the sum p+n1+n2 is equal to or higher than 3.

The method is further characterized in that said polysiloxane comprising at least one hydrogen atom bonded to a silicon atom has the general Formula (II) or (II-A) or is a mixture thereof (component a)) and said halogen-containing compound has the general formula (III) (component c)):

wherein:
$R^1$, $R^2$, $R^3$, $R^4$, $R^5$ and $R^6$ may be the same or different and each is independently selected from a hydrogen atom or a linear, branched or cyclic hydrocarbon residue having 1 to 20 carbon atoms which may contain at least one heteroatom;

in Formula (II) n is an integer from 1 to 1000 and p is an integer from 0 to 1000; and in Formula (II-A) n is an integer from 1 to 100 and p is an integer from 0 to 100, wherein the sum p+n is equal to or higher than 3, wherein:
X is a halogen atom; and
$R^a$ is selected from the group consisting of a hydrogen atom or a linear, branched or cyclic hydrocarbon residue having 1 to 20 carbon atoms which may contain at least one heteroatom.

In Formula (I), (I-A), (II), or (II-A), the different siloxane subunits n, n1, n2, and p are not necessarily present in the order illustrated herein. The subunits n, n1, n2, and p can be randomly distributed in the polysiloxane backbone in every possible combination.

In Formula (I), (I-A), (II), or (II-A), $R^1$, $R^2$, $R^3$, $R^4$, $R^5$ and $R^6$ may be the same or different and each is independently selected from a hydrogen atom or a linear, branched or cyclic hydrocarbon residue having 1 to 20 carbon atoms which may contain at least one heteroatom, preferably selected from O, N, S, Si, P, Cl, Br or F.

In preferred embodiments, $R^1$, $R^2$, $R^3$, $R^4$, $R^5$ and $R^6$ are the same or different and each is independently selected from the group consisting of a $C_1$-$C_{12}$ alkyl group, more preferably $C_1$-$C_8$ alkyl group, a $C_2$-$C_5$ alkenyl group, a $C_2$-$C_8$ alkynyl group, a $C_3$-$C_{10}$ cycloalkyl group, a $C_6$-$C_{18}$ aryl group and a $C_6$-$C_{18}$ aralkyl group, which may contain at least one heteroatom, preferably selected from O, N, S, Si, P, Cl, Br or F.

In more preferred embodiments, $R^1$, $R^2$, $R^3$, $R^4$, $R^5$ and $R^6$ are the same or different and each is independently selected from a $C_1$-$C_8$ alkyl group which may contain at least one heteroatom, preferably selected from O, N, S, Si, P, Cl, Br or F, in particular methyl, ethyl, n-propyl, fluoropropyl, n-butyl, sec-butyl, or tert-butyl, or a $C_6$-$C_{18}$ aryl group which may contain at least one heteroatom, preferably selected from O, N, S, Si, P, Cl, Br or F, in particular phenyl, tolyl or benzoyl. In most preferred embodiments, $R^1$, $R^2$, $R^3$, $R^4$, $R^5$ and $R^6$ are the same or different and independently selected from methyl or phenyl.

In Formula (I) or (I-A), A is preferably selected from O, S, $NR^7$ or $PR^7$, where $R^7$ is selected from a hydrogen atom, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, P, Cl, Br or F. In more preferred embodiments, A is selected from O or S, in particular O.

In Formula (I) or (I-A), Z is selected from a linear, branched or cyclic hydrocarbon residue having 2 to 60 carbon atoms, preferably 2 to 20 carbon atoms, which may contain at least one heteroatom, preferably selected from O, N, S, P, Si, Cl, Br or F.

In preferred embodiments, Z is selected from the group consisting of a $C_2$-$C_{20}$ alkylene group, a $C_2$-$C_{20}$ alkenylene group, $C_2$-$C_{20}$ alkynylene group, a $C_6$-$C_{18}$ arylene group and a $C_6$-$C_{18}$ aralkylene group, which may contain at least one heteroatom, preferably selected from O, N, S, P, Si, Cl, Br or F.

Exemplary heterocyclic compounds (component b)) are: ethylene oxide, 1,2-propylene oxide, tetrahydrofuran, 2-Methyltetrahydrofuran, oxetane, oxetene, tetrahydropyrane, oxepane, 1,4-dioxane, crown ethers, epichlorhydrin, 1,2-butylene oxide, 2,3-butylene oxide, 1,2-pentylene oxide, isopentylene oxide, 1,2-hexylene oxide, 1,2-heptylene oxide, styrene oxide, cyclohexene oxide, methylglycidyl ether, ethylglycidyl ether, allylglycidyl ether, phenylglycidyl ether, butadiene monoxide, isoprene monoxide, tolylglycidyl ether, cyclohexene oxide, cyclooctanee epoxide, cyclododecane epoxide, (+)-cis-limonene oxide, (+)-cis, trans-limonene oxide and (−)-cis, trans-limonene oxide, lactones, such as β-propiolactones, γ-butyrolactones, D-glucono-δ-lactones or ε-caprolactones, dilactones, lactams, lactides and thiolactones, thiolane, other heterocyclic rings such as piperidine, pyrroline or pyrrolidine, aziridine, azirine, oxirene, thiirane (episulfides), thiirene, phosphirane, phosphirene, azetidine, azete, thietane and thiete.

Particularly preferred for this invention are 1,2-propylene oxide, 1,2-butylene oxide, 2,3-butylene oxide, styrene oxide, cyclohexene oxide, tetrahydrofuran, tetrahydropyrane, oxepane, 1,4-dioxane, ε-caprolactones, thiolane and crown ethers.

In Formula (III), X is a halogen atom, preferably selected from Br, I or Cl, and $R^a$ is selected from a hydrogen atom or a linear, branched or cyclic hydrocarbon residue having 1 to 20 carbon atoms which may contain at least one heteroatom, preferably selected from O, N, S, Si, Cl, Br or F.

In preferred embodiments, X is selected from Br, I or Cl, more preferably Br or I, in particular Br.

In preferred embodiments, $R^a$ is selected from the group consisting of a hydrogen atom, a $C_1$-$C_{12}$ alkyl group, more preferably $C_1$-$C_8$ alkyl group, a $C_2$-$C_5$ alkenyl group, a $C_2$-$C_8$ alkynyl group, a $C_3$-$C_{10}$ cycloalkyl group, a $C_6$-$C_{18}$ aryl group and a $C_6$-$C_{18}$ aralkyl group, which may contain at least one heteroatom, preferably selected from O, N, S, Si, Cl, Br or F.

In more preferred embodiments, $R^a$ is a $C_2$-$C_8$ alkenyl group, more preferably selected from ethenyl, propenyl, butenyl, or pentenyl and structural isomers thereof such as 1- or 2-propenyl, 1-, 2—, or 3-butenyl.

In Formula (II) or (II-A), n is the sum n1+n2 of Formula (I) or (I-A).

In some embodiments, in Formulae (I) and (II), n or the sum n1+n2 is an integer from 1 to 500, more preferably from 1 to 100; and/or p is an integer from 0 to 500, more preferably from 0 to 100. In some embodiments, the polysiloxane may contain diorganosiloxane units, such as dimethylsiloxane or diphenylsiloxane units, in the backbone. The ratio between n units and p units can be varied.

In some embodiments, in Formulae (I-A) and (II-A), n or the sum n1+n2 is an integer from 1 to 50, more preferably from 1 to 30; and/or p is an integer from 0 to 50, more preferably from 0 to 30, wherein the sum p+n or the sum p+n1+n2 is equal to or higher than 3.

The halogen-functionalized polysiloxane is obtained by reacting at least one polysiloxane containing at least one hydrogen atom bonded to a silicon atom and at least one heterocyclic compound in the presence of a platinum catalyst and a halogen source. The synthetic pathway is a so-called "halosilation" reaction in which the heterocyclic compound is ring-opened in the presence of a platinum catalyst and a halogen source, resulting in a formal insertion of the opened heterocycle into the SiH bond. On the final product, the heteroatom of the former heterocyclic compound is bonded to the silicon atom from the former SiH moiety while and the halogen is bonded to the last carbon atom of the opened chain.

In preferred embodiments, the reaction is carried out for a time sufficient to yield a halogen-functionalized polysiloxane that the SiH moieties in the polysiloxane are substantially completely converted to the halogen-functionalized moiety. Preferably, the obtained halogen-functionalized polysiloxane contains less than 5 mol %, more preferably less than 1 mol %, in particular less than 0.5 mol % of SiH moiety—which is not converted—based on the total moles of the silicon atom which constitutes the obtained polysiloxane backbone.

In certain embodiments, the platinum can be removed after the reaction by methods known in the art, such as filtration, preferably by filtration through celite after decolorizing by adding activated carbon and an excess of pentane at room temperature. The solvents and volatiles can be evaporated under vacuum.

This reaction follows a zero-order kinetic regime allowing to have a complete control of the reaction progress and hence of the number of halosilated side groups in the polysiloxane backbone. The degree of halogenation can be calculated and controlled with the amount of the heterocyclic compound and the halogen source used and SiH moieties contained.

The "halosilation" reaction according to the present invention can be performed under solvent-free conditions, as well as in polar or non-polar solvents, such as alcohols, aromatic or aliphatic alkanes, alkenes or alkynes, halogen-functionalized aromatic or aliphatic hydrocarbons and hydrocarbons containing at least one heteroatom, such as O, N, S, P, Cl, Br or F. Preferably, the reaction is carried out in solvents such as toluene, THF, heptane, hexane or chloroform. Any residual solvent is preferably removed after completion of the reaction.

The reaction can be carried out at a reaction temperature in the range from 0 to 200° C., preferably from 50 to 150° C., and/or at a reaction pressure from 1 to 50 bar, preferably from 1 to 10 bar.

Various features and embodiments of the disclosure are described in the following examples, which are intended to be representative and not limiting. The following examples serve to explain the invention, but the invention is not limited thereto.

EXAMPLES

Example 1: Preparation of 3-(4-bromobutoxy)methylsiloxane

A 250 ml three neck round bottomed flask was degassed under high vacuum ($1^{-3}$ mbar) and flushed with argon. Then, 200 μL of Karstedt (2% of Pt in the catalyst, 0.1% mol in the mixture) and toluene (50 mL, dried over molecular sieves) were added into the flask under argon atmosphere and stirred at room temperature (20° C.) for a couple of minutes. Then tetrahydrofuran (18.5 mL, dried over molecular sieves) and allyl bromide (19.8 mL, 97%) were added into the system. Polyhydridomethylsiloxane (14.9 mL, Mn 1900 g/mol) were added dropwise. The mixture was stirred and refluxed at 100° C. inside under inert atmosphere (Ar) until complete conversion of the SiH groups was achieved (the reaction was followed by 1H-NMR). The mixture (when necessary) was decolorized by adding activated carbon and an excess of pentane and stirred for 16 h at room temperature. The crude was filtrated trough celite, and the solvents and volatiles were evaporated under vacuum. The obtained product (yield 80-90%) was a colorless, transparent viscous liquid. The molecular weight and structure of the product was confirmed by GPC ($M_n$=4882 g/mol, PDI 2.190) and NMR spectroscopy.

Example 2: Preparation of 3-(4-bromobutoxy)methylsiloxane

The procedure was the same as shown in Example 1 except that the inside temperature was 75° C. The obtained product (yield 59%) was a colorless, transparent viscous liquid. The molecular weight and structure of the product was confirmed by GPC (Mn=1616 g/mol, PDI 2.228) and NMR spectroscopy.

Example 3: Preparation of 3-(4-bromobutoxy)methylsiloxane

The procedure was the same as shown in Example 1 except that the inside temperature was 90° C. The obtained product (yield 81%) was a colorless, transparent viscous liquid. The molecular weight and structure of the product was confirmed by GPC (Mn=5113 g/mol, PDI 2.118) and NMR spectroscopy.

Example 4: Preparation of 3-(4-bromobutoxy)methylsiloxane-co-dimethylsiloxane A 250 ml three neck round bottomed flask was degassed under high vacuum ($1^{-3}$ mbar) and flushed with argon. Then, 270 μL of Karstedt (2% of Pt in the catalyst, 0.1% mol in the mixture) and THF (40 mL, dried over molecular sieves) were added into the flask under argon atmosphere and stirred at room temperature (20° C.) for a couple of minutes. Then allyl bromide (11.78 mL, 97%) were added into the system. Polyhydridomethylsiloxane-co-polydimethylsiloxane (19.9 mL, Mn 2200 g/mol) were added dropwise. The mixture was stirred and refluxed (oil bath temperature: 100° C.) under inert atmosphere (Ar) until complete conversion of the SiH groups was achieved (the reaction was followed by 1H-NMR). The mixture (when necessary) was decolorized by adding activated carbon and an excess of pentane and stirred for 16 h at room temperature. The crude was filtrated trough celite, and the solvents and volatiles were evaporated under vacuum. The obtained product (yield 80-90%) was a colorless, transparent viscous liquid. The molecular weight and structure of the product was confirmed by GPC ($M_n$=4495 g/mol, PDI 1.837) and NMR spectroscopy.

Example 5: Preparation of 1-(4-bromobutoxy)-1',3,3',5,5',7,7'-Heptamethylcyclotetrasiloxane A 50 ml three neck round bottomed flask was degassed under high vacuum ($1^{-3}$ mbar) and flushed with argon. Then, 400 μL of Karstedt (2% of Pt in the catalyst, 0.1% mol in the mixture) and THF (10 mL, dried over molecular sieves) were added into the flask under argon atmosphere and stirred at room temperature (20° C.) for a couple of minutes. Then allyl bromide (1.5 mL, 97%) were added into the system. 1,1',3,3',5,5',7-Heptamethylcyclotetrasiloxane (5.3 mL, $M_n$ 282 g/mol) were added dropwise. The mixture was stirred and refluxed (oil bath temperature: 80° C.) under inert atmosphere (Ar) until complete conversion of the SiH groups was achieved (the reaction was followed by 1H-NMR). The mixture (when necessary) was decolorized by adding activated carbon and an excess of pentane and stirred for 16 h at room temperature. The crude was filtrated trough celite, and the solvents and volatiles were evaporated under vacuum. The obtained product (isolated yield 84%; conversion 89.1%) was a colorless to slightly yellow, transparent low viscous liquid. The molecular weight and structure of the product was confirmed by GPC ($M_n$=463 g/mol, PDI 1.055) and NMR spectroscopy.

Comparative Example 6 (adapted from Z. Lu, et al., J. Organomet. Chem. 2012, 697, 51-56)

A 250 ml three neck round bottomed flask was degassed under high vacuum ($1^{-3}$ mbar) and flushed with argon. Then, $PdCl_2$ (208 mg, 1.6 mol-% in the mixture) and THF (18.5 mL, dried over molecular sieves) were added into the flask under argon atmosphere and stirred at room temperature (20° C.) for a couple of minutes. Then allyl bromide (7.29 mL, 97%) was added into the system. Polyhydridomethylsiloxane (5.0 mL, $M_n$ 1900 g/mol) were added dropwise. The mixture was stirred (oil bath temperature: 50° C.) under inert atmosphere (Ar) for 24 hours. The solvents and volatiles were evaporated under vacuum. The obtained product (yield ~70%) was a black viscous liquid with precipitation. The molecular weight and structure of the product was confirmed by GPC ($M_n$=6105 g/mol, PDI 3.872) and NMR spectroscopy.

Comparative Example 7 (adapted from Z. Lu, et al., J. Organomet. Chem. 2012, 697, 51-56)

The procedure was the same as shown in Comparative Example 6 except that the temperature was 60° ° C. For comparison reasons this product was decolorized by adding activated carbon and an excess of pentane and stirred for 16 h at room temperature. The crude was filtrated trough celite, and the solvents and volatiles were evaporated under vacuum. The purified product was yellow colored, which changes during time to black. The molecular weight and structure of the product was confirmed by GPC ($M_n$=2395 g/mol, PDI 2.678) and NMR spectroscopy.

Comparative Example 8 (adapted from Z. Lu, et al., J. Organomet. Chem. 2012, 697, 51-56)

The procedure is the same as shown in Comparative Example 6 except that the temperature was 70° C. For comparison reasons this product was decolorized by adding activated carbon and an excess of pentane and stirred for 16 h at room temperature. The crude was filtrated trough celite, and the solvents and volatiles were evaporated under vacuum. The purified product was yellow colored, which changes during time to black. The molecular weight and structure of the product was confirmed by GPC ($M_n$=5536 g/mol, PDI 2.483) and NMR spectroscopy.

Comparative Example 9 (adapted from Z. Lu, et al., J. Organomet. Chem. 2012, 697, 51-56)

A 50 ml three neck round bottomed flask was degassed under high vacuum ($1^{-3}$ mbar) and flushed with argon. Then, $PdCl_2$ (24 mg, 1.6 mol-% in the mixture) and THF (5 mL, dried over molecular sieves) were added into the flask under argon atmosphere and stirred at room temperature (20° C.) for a couple of minutes. Then allyl bromide (0.84 mL, 97%) was added into the system. 1,1',3,3',5,5',7-Heptamethylcyclotetrasiloxane (3.3 mL, $M_n$ 282 g/mol) were added dropwise. The mixture was stirred (oil bath temperature: 50° C.) under inert atmosphere (Ar) for 24 hours. The solvents and volatiles were evaporated under vacuum. The obtained product (isolated yield 83%; conversion 84.6%) was a clear viscous slightly yellow liquid with black precipitation. The molecular weight and structure of the product was confirmed by GPC ($M_n$=443 g/mol, PDI 1.042) and NMR spectroscopy.

NMR-Spectroscopy:

All NMR measurements were done on a Bruker 300 MHz and 400 MHz instrument with deuterated chloroform as solvent. All the samples were measured at room temperature (297 K). The chemical shifts are given in ppm. The calibration of the chemical shifts in 1H spectra was carried out by using the shifts of the deuterated solvents (CDCl3; δH 7.26).

GPC:

Gel permeation chromatography was carried out using HP1090 II Chromatography with DAD detector (HEWLETT PACKARD) at 40° C. Tetrahydrofuran (THF) was used as an eluent. THF was passed through three PSS SDV gel columns with molecular weight ranges of 102, 103 and 104 g·mol-1 with a flow rate of 0.9 ml·min-1. The calibration of the device was carried out using polystyrene standards.

Elemental Analysis:

Elemental analyses were performed on a flame atomic absorption spectrometer Perkin-Elmer Analyst 300 (Pd and Pt).

Hazen Factor and Yellowness Index:

The color values were measured with a LCS III from BYK. The LCS III is a VIS spectrophotometer with a wavelength range of 320 to 1100 nm. The Hazen color value (ISO 6271, also known as "AHPA-method" or Platinum-Cobalt Scale) is defined as mg of platinum per 1 litre of solution. The Yellowness Index was calculated and displayed in accordance with ASTM D 1925 for illuminant C and a 2° standard observer. The instrument was calibrated with distilled water.

Figure 1:
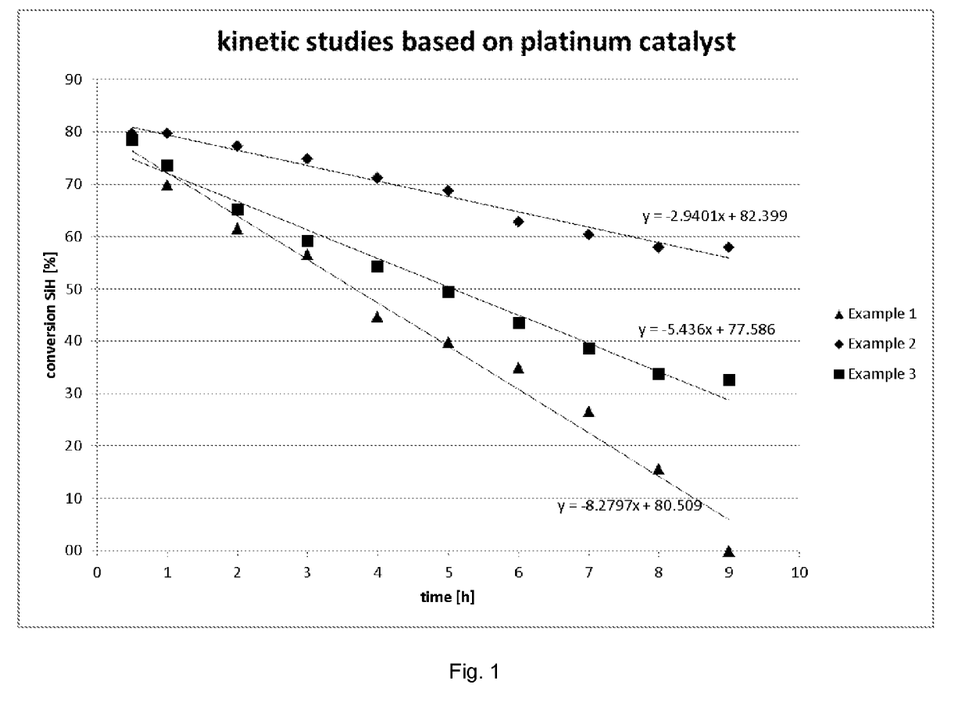
FIG. 1 shows the conversion of SiH moieties compared to the time of Examples 1 to 3.

FIG. 1 shows the conversion of SiH groups compared to the time (measured by integration of 1H-NMR spectra) of Example 1 to 3 with different temperatures. The linear shape of the curves proves that the reactions follow a zero-order kinetic with platinum as catalyst. For an overview of reaction kinetics and calculation of activation energies, s. A. Cornish-Bowden, Fundamentals of Enzyme Kinetics, John Wiley & Sons, 2012 or S. K. Upadhyay, Chemical Kinetics and Reaction Dynamics, Springer, 2006 is included as a reference. During the whole reaction time there was no change in the reaction speed. The reaction speed does not depend on the concentration of any monomer. The activation energy can be calculated with the slope of the curve at different temperatures by using the Arrhenius equation. Calculations were done with the temperature inside of the flask. An activation energy of 45.1±2.2 KJ/mol could be calculated.

Figure 2:
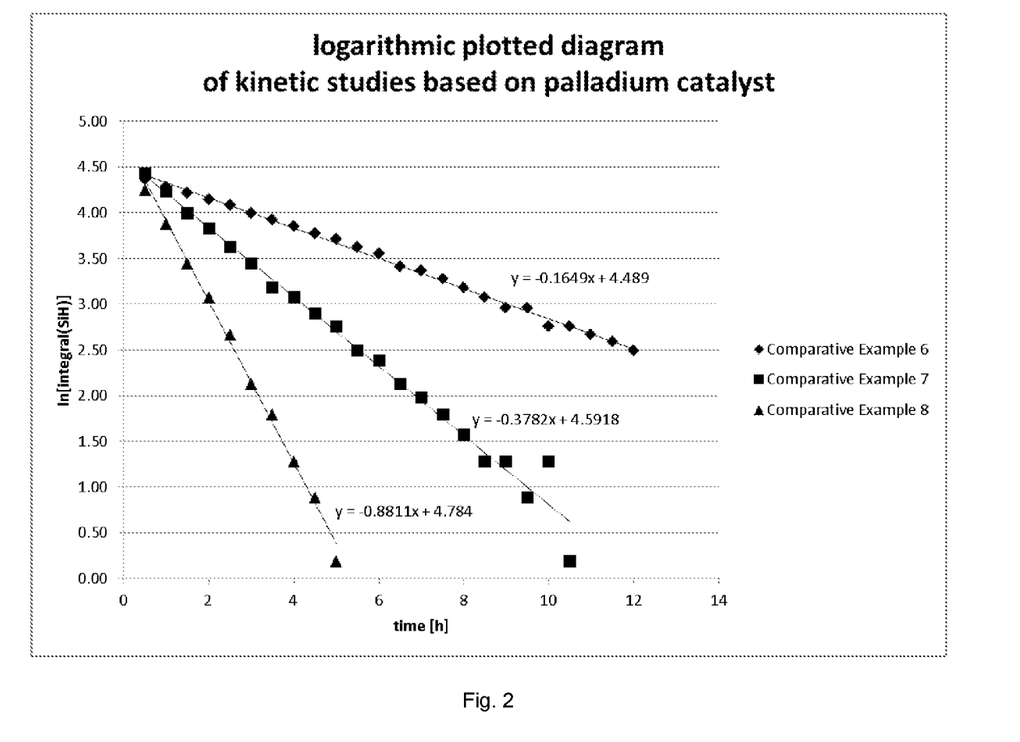
FIG. 2 shows the logarithmic plotted conversion of SiH moieties compared to the time of Comparative Examples 6 to 8.

FIG. 2 shows the logarithmic plotted conversion of SiH groups compared to the time (measured by integration of 1H-NMR spectra) of Comparative Example 6 to 8 with different temperatures which follows the first order kinetic regime. The reaction needed more time for a full conversion, because the reaction speed depends on the concentration of monomer. The more monomer is converted, the slower the reaction speed is. An activation energy of 77.3±3.1 KJ/mol could be calculated, which is twice as much as the invention.

Table 1 shows the difficulties of removing the palladium catalyst after the reaction. The amount of platinum in Example 1 is more than 100 times lower than the amount of palladium in Comparative Example 6. The high amount of palladium causes a contamination of the product.

TABLE 1

Determination of Pt and Pd by elemental analysis

|  | Pt [wt-%] | Pd [wt-%] |
|---|---|---|
| Example 1 | 0.0108 ± 0.0079 |  |
| Comparative Example 6 |  | 5.3048 ± 1.4691 |

Table 2 shows the Hazen Factor and Yellowness Index of Examples 1 and 4 and Comparative Example 6. Compared to Examples 1 and 4, Comparative Example 6 shows a very high Hazen Factor, as well as Yellowness Index, which are more than five times higher. Comparative Example 6 could only be measured in solution (THF, ratio 1:3) as the purified product got darker during time and showed results out of the working area of the instrument. The color changed from yellow to brown and then to dark brown during time. This was caused by the palladium, which cannot be removed with mentioned working-ups. In literature there is no filtration step mentioned (only removing solvent by vacuo), so the palladium was not removed at all.

TABLE 2

Determination of Hazen Factor and Yellowness Index

|  | Hazen Factor | Yellowness Index |
|---|---|---|
| Example 1 | 112 | 26.4 |
| Example 4 | 42 | 10.6 |
| Comparative Example 6 | 734 | 103.9 |

The invention claimed is:

1. A method for preparing a halogen-functionalized polysiloxane having the general Formula (I) or (I-A) or a mixture thereof:

wherein:
$R^1$, $R^2$, $R^3$, $R^4$, $R^5$ and $R^6$ may be the same or different and each is independently selected from a hydrogen atom or a linear, branched or cyclic hydrocarbon residue having 1 to 20 carbon atoms which may contain at least one heteroatom;

A is a heteroatom, or a heteroatom-containing group, or $NR^7$ or $PR^7$, where $R^7$ is selected from a hydrogen atom, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom;

Z is selected from a linear, branched or cyclic hydrocarbon residue having 2 to 60 carbon atoms which may contain at least one heteroatom;

X is a halogen atom;

in Formula (I) n1 is an integer from 1 to 1000, n2 is an integer from 0 to 100, and p is an integer from 0 to 1000;

in Formula (I-A) n1 is an integer from 1 to 100, n2 is an integer from 0 to 10, and p is an integer from 0 to 100, wherein the sum p+n1+n2 is equal to or higher than 3;

by reacting
a) at least one polysiloxane of the formula (II), formula (II-A), or a mixture thereof:

Formula (II)

Formula (II-A)

wherein $R^1$ through $R^6$ are as defined above;
in Formula (II) n is an integer from 1 to 1000 and p is an integer from 0 to 1000; and
in Formula (II-A) n is an integer from 1 to 100 and p is an integer from 0 to 100, wherein the sum p+n is equal to or higher than 3,
b) at least one heterocyclic compound; and
c) at least one halogen-containing compound;
wherein the reaction is catalyzed by at least one platinum catalyst.

2. The method according to claim 1, wherein the platinum catalyst is selected from the group consisting of chloroplatinic acids; alcohol modified chloroplatinic acids; olefin complexes of chloroplatinic acid; complexes of chloroplatinic acid and divinyltetramethyldisiloxane; fine platinum particles adsorbed on carbon carriers; platinum supported on metal oxide carriers; platinum black; platinum acetylacetonate; platinous halides; complexes of platinous halides with unsaturated compounds; styrene hexamethyldiplatinum; platinum divinyltetramethyldisiloxane complex; the reaction product of chloroplatinic acid and an unsaturated aliphatic group-containing organosilicon compound; and a neutralized complex of platinous chloride and divinyltetramethyldisiloxane.

3. The method according to claim 1, wherein the platinum catalyst is hexachloroplatinic acid or platinum divinyltetramethyldisiloxane complex.

4. The method according to claim 1, wherein the platinum catalyst is present in an amount of from 0.0001 mol % to 10 mol % of platinum based on the molar quantity of silicon-bonded hydrogen in the polysiloxane.

5. The method according to claim 1, wherein the polysiloxane comprising at least one hydrogen atom bonded to a silicon atom is a linear- or cyclopolysiloxane, or a mixture thereof.

6. The method according to claim 1, wherein the obtained halogen-functionalized polysiloxane has a number average molecular weight of from 100 to 50,000 g/mol.

7. The method according to claim 1, wherein said halogen-functionalized polysiloxane has the general Formula (I).

8. The method according to claim 1 wherein the halogen-containing compound has the general formula (III):

Formula (III)

wherein:
X is a halogen atom; and
$R^a$ is selected from the group consisting of a hydrogen atom or a linear, branched or cyclic hydrocarbon residue having 1 to 20 carbon atoms which may contain at least one heteroatom.

9. The method according to claim 1, wherein the reaction is carried out in at least one solvent.

10. The method according to claim 1, wherein the reaction is carried out at the temperature of from 0 to 200° C. and/or a reaction pressure of from 1 to 50 bar.

11. A halogen-functionalized polysiloxane obtained by the method according to claim 1.

12. A method for preparing a halogen-functionalized polysiloxane by reacting
a) at least one polysiloxane comprising at least one hydrogen atom bonded to a silicon atom having the general Formula (II) or (II-A) or a mixture thereof Formula (II)

Formula (II-A)

wherein:
$R^1$, $R^2$, $R^3$, $R^4$, $R^5$ and $R^6$ may be the same or different and each is independently selected from a hydrogen atom or a linear, branched or cyclic hydrocarbon residue having 1 to 20 carbon atoms which may contain at least one heteroatom;
in Formula (II) n is an integer from 1 to 1000 and p is an integer from 0 to 1000; and
in Formula (II-A) n is an integer from 1 to 100 and p is an integer from 0 to 100, wherein the sum p+n is equal to or higher than 3;
b) at least one heterocyclic compound; and
c) at least one halogen-containing compound having the general formula (III):

Formula (III)

wherein:
X is a halogen atom; and
$R^a$ is selected from the group consisting of a hydrogen atom or a linear, branched or cyclic hydrocarbon residue having 1 to 20 carbon atoms which may contain at least one heteroatom;
wherein the reaction is catalyzed by at least one platinum catalyst.

13. The method according to claim 12, wherein said halogen-functionalized polysiloxane has the general Formula (I) or (I-A) or a mixture thereof:

Formula (I)

Formula (I-A)

wherein:

$R^1$, $R^2$, $R^3$, $R^4$, $R^5$ and $R^6$ may be the same or different and each is independently selected from a hydrogen atom or a linear, branched or cyclic hydrocarbon residue having 1 to 20 carbon atoms which may contain at least one heteroatom;

A is a heteroatom, or a heteroatom-containing group, or $NR^7$ or $PR^7$, where $R^7$ is selected from a hydrogen atom, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom;

Z is selected from a linear, branched or cyclic hydrocarbon residue having 2 to 60 carbon atoms which may contain at least one heteroatom;

X is a halogen atom;

in Formula (I) n1 is an integer from 1 to 1000, n2 is an integer from 0 to 100, and p is an integer from 0 to 1000;

in Formula (I-A) n1 is an integer from 1 to 100, n2 is an integer from 0 to 10, and p is an integer from 0 to 100, wherein the sum p+n1+n2 is equal to or higher than 3.

* * * * *